United States Patent [19]
Lee et al.

[11] Patent Number: 5,862,299
[45] Date of Patent: Jan. 19, 1999

[54] CONDITIONAL ACCESS SYSTEM FOR LOCAL STORAGE DEVICE

[75] Inventors: Chuen-Chien Lee, Fremont; Hajime Inoue, San Jose; Koichi Goto, San Diego, all of Calif.

[73] Assignees: Sony Corporation, Tokyo, Japan; Sony Electronics Inc., Park Ridge, N.J.

[21] Appl. No.: 665,893

[22] Filed: Jun. 19, 1996

[51] Int. Cl.$^6$ .................................................. H04N 5/91
[52] U.S. Cl. .............................................. 386/94; 386/95
[58] Field of Search .................................. 386/94, 83, 92, 386/46, 52, 4, 95; 360/13, 15; 380/3, 10, 7, 11, 15; H04N 5/91

[56] References Cited

U.S. PATENT DOCUMENTS

| | | | |
|---|---|---|---|
| 4,520,404 | 5/1985 | Vov Kohorn | 386/94 |
| 5,434,678 | 7/1995 | Abecassis | 386/46 |
| 5,627,655 | 5/1997 | Okamoto et al. | 386/94 |

*Primary Examiner*—Robert Chevalier
*Attorney, Agent, or Firm*—Frommer Lawrence & Haug, LLP; William S. Frommer

[57] ABSTRACT

A technique for selectively inhibiting a video recorder from recording and/or reproducing those television programs, which are not authorized for viewing. Authorization data associated with respective television programs that are receivable by the recorder and indication of whether that program is authorized for recording and/or reproduction, is received by the recorder prior to (or multiplexed with) the television program and is stored thereat. When the television program is received, the stored authorization data associated with that is read to determine if the received television program is authorized for recording and/or reproduction. If not, the recorder is inhibited from recording and/or reproducing that unauthorized television program.

18 Claims, 4 Drawing Sheets

CONDITIONAL ACCESS SYSTEM FOR LOCAL STORAGE DEVICE

BACKGROUND OF THE INVENTION

This invention relates to selectively inhibiting television receiving apparatus from recording programs, received as digital video data, which are not authorized for viewing.

Techniques have been proposed heretofore to permit viewers to selectively enable and disable television receiving apparatus to prevent unauthorized television programming from being recorded and/or reproduced. With the introduction of the digital image communication systems such as the digital cable TV (CATV) systems, many services can be provided that were previously unheard of with the conventional TV broadcasting and CATV systems. The digital CATV systems not only provide conventional TV images, but can provide such services as electronic mail and electronic banking.

In the digital image communication systems, image storage devices are preferably incorporated into a conventional television receiving apparatuses. This enables the viewer to watch a television program on a particular channel while simultaneously recording television programs then being broadcasted on other channels in the image storage device; which can be reproduced later by the viewer.

The digital cassette tape recorder (hereinafter referred to as digital VCR) performs processing, such as parity code addition, ECC, formatting, modulating and so forth on video signals that have been highly efficiently coded. Thereafter, one or more rotating heads of the digital cassette tape recorder records the digital video signals on a magnetic tape. The digital cassette tape recorder also performs playback processing, such as demodulating, format decomposing, error correction and so forth on the signals played back from the magnetic tape so as to reproduce the digital video signals.

The digital cassette tape recorder may be incorporated into a conventional television receiver or into a decoder of the type typically used in cable television or direct satellite broadcast systems. Such decoders or converters are known and, consistent with industry usage, are referred to herein, as set-top converters.

In addition, in the digital CATV system, data in which a plurality of programs have been time-division multiplexed are transmitted. Normally, one program channel is selected by a television receiving device to display or store the program on that selected channel. However, programs broadcast on other channels at the same time as the selected program cannot be viewed or recorded for later viewing by that television receiving device. Thus, it is desirable to record those programs so they can be viewed later by the subscriber.

It is also desirable to record programs, such as movies, feature presentations, pay-per-view, etc., transmitted from the source during off-hours, e.g., midnight, so those programs subsequently can be viewed by the subscriber upon receiving proper authorization.

OBJECTS OF THE INVENTION

Therefore, it is an object of the present invention to provide a technique by which television receiving apparatus is selectively inhibited from recording those programs, received as digital video data, which are not authorized for viewing.

Another further object of this invention is to provide a technique by which television receiving apparatus is selectively inhibited from reproducing those programs, recorded as digital video data, which are not authorized for reproduction.

A further object of this invention is to provide a technique as aforesaid, which additionally decodes the recorded video data after reproducing it from the recording medium.

An additional object of this invention is to provide a technique by which subscribers may rent or purchase videos using their television receiving apparatus.

Various other objects, advantages and features of the present invention will become readily apparent from the ensuing detailed description, and the novel features will be particularly pointed out in the appended claims.

SUMMARY OF THE INVENTION

In accordance with this invention, television receiving apparatus is selectively inhibited from recording those television programs which are not authorized for viewing. Program information associated with television programs that are receivable by the television receiving apparatus, such as title data representing the title of that program, rating data representing the content of that program, and authorization data indicating whether that program is authorized for recording and/or reproduction, is stored in the receiving apparatus. When digital video data is received by the television receiving apparatus, the authorization data associated with the television program corresponding to the received digital video data is read from memory to determine if the received television program is authorized for recording. If not, the television receiving apparatus is inhibited from recording the received video data corresponding to that unauthorized television program. As described herein, a program cannot be recorded until it has been previously authorized for recording by the commercial television broadcast/distribution systems provider (e.g., enablement of particular programs in pay-per-view application).

In a preferred embodiment, the received digital video data is encoded and the television receiving apparatus requires a scrambling key to decode the received digital video data. The decoded digital data is then recorded on a recording medium. As a preferred feature of the present invention, the scrambling key is transmitted in encoded form from a source to the television receiving apparatus.

In accordance with another aspect of this invention, television receiving apparatus is selectively inhibited from reproducing those television programs which are not authorized for viewing. When a program recorded on a recording medium is selected by the subscriber to be reproduced, the authorization data associated with the selected television program corresponding to the recorded digital video data is read from memory to determine if the selected television program is authorized for reproduction. If not, the television receiving device is inhibited from reproducing the recorded video data corresponding to that unauthorized television program. As described herein, a program cannot be reproduced until it has been previously authorized for reproduction by the commercial television broadcast/distribution systems provider.

As a preferred feature of the present invention, the recording medium contains encoded digital video data and the encoded digital video data corresponding to a selected program must be decoded before it can be viewed by the subscriber. The television receiving apparatus requires a scrambling key, which is also encoded, to decode the encoded digital video data.

In accordance with yet another aspect of this invention, the recording medium is a digital video tape. The authorization information associated with the programs on the video tape is also stored on that video tape. The television receiving apparatus reads from the video tape the authorization data associated with a selected program in the event that corresponding authorization data is not present in the memory. This feature enables other television receiving apparatus to reproduce authorized programs even if the authorization data associated with the selected program is not present in the memory of that other television receiving apparatus.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF PREFERRED EMBODIMENTS

Figure 1:
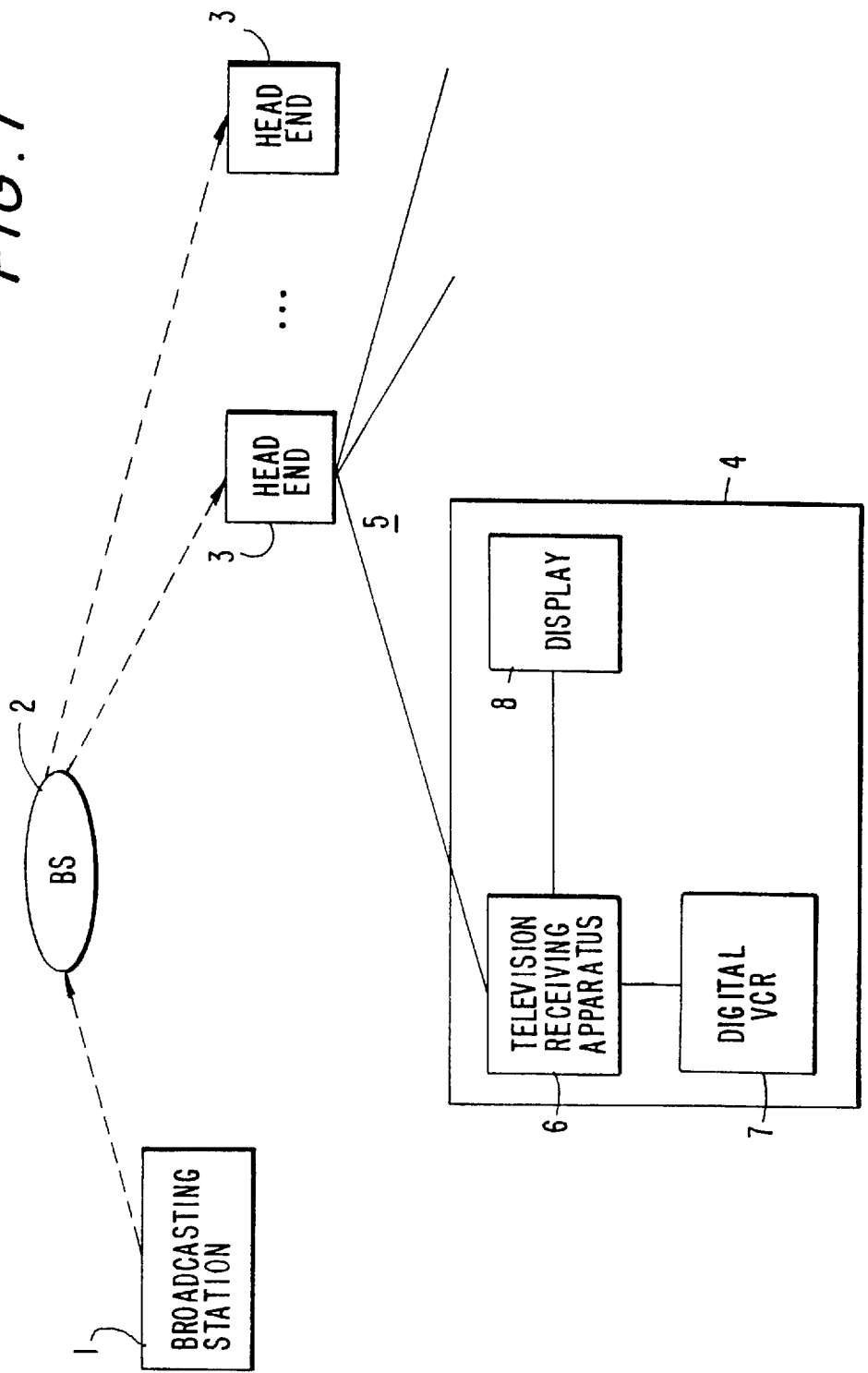
FIG. 1 is a block diagram showing a digital CATV system which incorporates the present invention.

The present invention is readily implemented by presently available television receiving apparatus and electronic components. The invention finds ready application in virtually all commercial television broadcast/distribution systems, including over-the-air broadcasts, wired cable transmission systems and direct satellite broadcast systems. As is conventional, set-top converters typically are used to receive and decode television programs that are transmitted by cable systems or by direct satellite broadcast systems. Normally, such set-top converters are not needed to decode television programs that are transmitted by over-the-air systems. Set-top converters, like other television receiving devices, include tuning circuits (either analog or digital) which are operable to tune to any one of the different broadcast channels that may be received thereby. For example, if the set-top converter is used in a cable transmission system over which 25 different channels of television programming are transmitted, the tuning circuitry included in the converter is adapted to select any one of such 25 channels. Similarly, if the set-top converter is provided in a direct satellite broadcast system over which 150 different broadcast channels of television programming are received, the tuning circuitry included in the converter is adapted to select any one of those 150 different channels. The tuning circuitry included in conventional over-the-air television receiving devices is, of course, adapted to select any one of the over-the-air channels that normally are transmitted.

The present invention contemplates the transmission of program information data of the type that presently is available. Typically, such program information data is transmitted on a predetermined broadcast channel separate and apart from the broadcast channels over which television programming is transmitted. However, program information data that is multiplexed with television programming likewise may be transmitted. The former transmission of program information data is known as out-of-band transmission; and the present discussion refers to such out-of-band transmission in over-the-air broadcast systems, cable distribution systems and direct satellite broadcast systems. In one embodiment, the program information data includes the following information for each television program that is transmitted: the channel over which that television program is transmitted (i.e., the channel number), the name of the television program, and the rating data which represents the content of that television program.

In addition to the foregoing information included in the program information data, it is a feature of the present invention also to include authorization data stored in the memory of the television receiving apparatus indicating whether a television receiving apparatus is authorized to record and/or reproduce that television program. For example, the authorization data may include authorization status information indicating whether the television receiving apparatus has a limited or complete authorization to reproduce a particular program. The authorization data may further include expiration date data which represents the last date the television receiving apparatus with the limited authorization is authorized to reproduce that program, and price data representing the additional payment required to change the limited authorization status of the television receiving apparatus to the complete authorization status.

Turning now to FIG. 1, there is illustrated a block diagram of a digital CATV system which incorporates the present invention. A broadcasting station 1 transmits broadcasting signals to a satellite 2 (for example, a broadcasting or communication satellite). These broadcasting signals are re-transmitted to head-ends 3 disposed in individual service areas, each of which contains an antenna to receive the broadcasting signals, a receiving amplifier, an image source input portion (if necessary), a modulator to modulate the received broadcasting signals, and a multiplexer to multiplex the output of the modulator before it is output to a transmission line.

Individual homes 4, i.e., subscribers to the CATV system, are connected to the head-end 3 by a cable 5, which can be constructed as either a coaxial cable, an optical fiber cable, or a combination thereof. The cable 5 is connected in a tree shape or in a star shape. A subscriber of the CATV system (home 4) is provided with a television receiving apparatus 6, which contains a tuner 10 for selectively tuning to a desired broadcasting channel and a digital VCR 7 to record or reproduce programs. The reproduced digital video data which constitute the program reproduced from a recording medium are supplied to a display 8 whereat it is displayed to the viewer. It will be appreciated that display 8 includes the usual video processing circuitry normally provided in television receiving apparatus to permit a television picture (and accompanying audio information) to be displayed to a viewer.

The CATV system according to the present invention is not limited to the CATV system shown in FIG. 1. For example, a plurality of program providers can transmit programs to the satellite 2. A CATV station may be interposed between the satellite and the head-ends 3 to receive broadcasting signals from the satellite 2 and relay those signals to the head-ends by optical fiber cables. Each head-end is connected to many homes by optical fiber cables or coaxial cables. In addition, the present invention may be applied to a digital image communication system (such as a TV conference system) other than the digital CATV system.

The digital broadcasting signal generated in the head-end 3 contains a plurality of broadcast channels which are encoded for example using motion compensated inter-frame prediction coding techniques. Highly efficient encoders are utilized in the head-end 3 (not shown) in accordance with the MPEG (Moving Picture Experts Group) system that has been adopted by the ISO (International Organization for Standardization). The encoded broadcasting signals are then time-division multiplexed into a packet, which is digitally modulated, for example, using a PSK modulation technique.

Each packet is composed of 188 bytes with 4 bytes reserved for an ID code. The ID code preferably is positioned at the beginning of each packet of time-division multiplexed data and contains program information data.

Each broadcast channel contains a plurality of programs which are encoded so that only authorized subscribers of the CATV system can receive the broadcast programs. The encoding technique normally depends on each broadcast channel.

Figure 2:
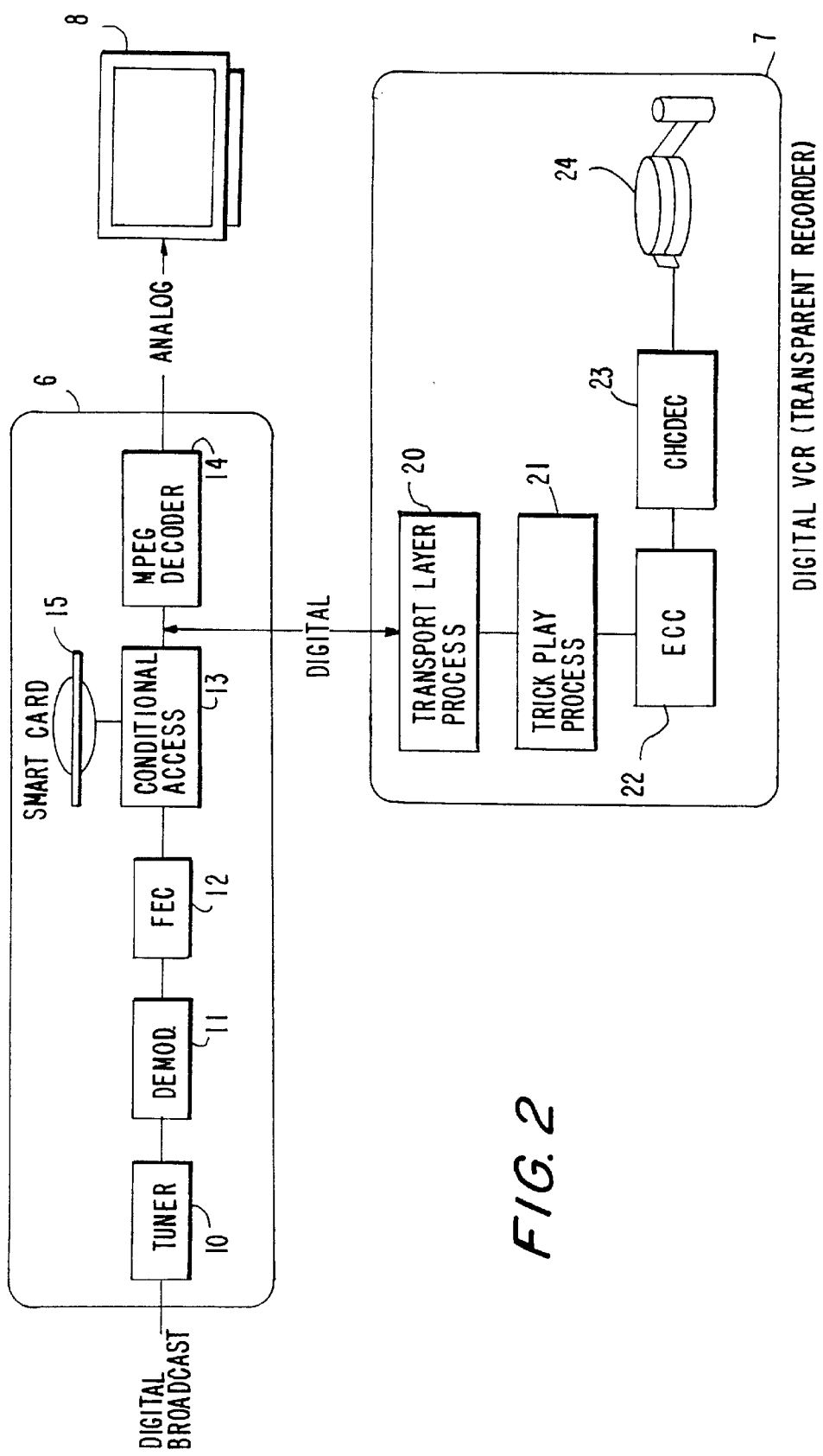
FIG. 2 is a block diagram showing the incorporation of the present invention in television receiving apparatus.

FIG. 2 illustrates a block diagram of television receiving apparatus 6 which incorporates the present invention. The apparatus illustrated in FIG. 2 may be included in a set-top converter, a television receiver, a video recorder or other conventional apparatus typically used to receive and cause the display of television pictures. Control signals, whether received by remote receiver (not shown) or generated by control elements provided directly on the television receiving apparatus, such as a channel selector (not shown), are coupled to a microprocessor (not shown) which controls the operation of a tuner 10 so as to tune to a selected television channel received thereby.

Although not described in detail, it will be appreciated that the microprocessor may be a conventional microprocessor, such as a relatively inexpensive, small eight-bit controller or a powerful, high-speed microprocessor for example, a "486"-type microprocessor or Pentium microprocessor manufactured by Intel Corp.

A signal of the selected channel is demodulated by a demodulator 11. If the demodulated signal contains an error attributed to the communication path, the error is corrected by a forward error correcting circuit 12. The resultant signal is supplied to a conditional access circuit 13 to determine if that signal constitutes a program that is authorized for recording by the television receiving apparatus 6. The conditional access circuit 13 reads from a memory (not shown) the authorization data associated with the program to determine if the television receiving apparatus is authorized to record that program. If there is no authorization data in the memory associated with that program, the conditional access circuit 13 disables the operation of the digital VCR 7 and/or causes an indication, such as the energization of an LED (not shown), to be displayed to the subscriber, indicating that the television receiving apparatus is not authorized to record the received program. Such indication informs the subscriber to access the authorization center of the cable distribution system to obtain the necessary authorization to record the program. An additional level of security is provided by disabling the digital VCR 7 to prevent unauthorized access to the digital VCR 7, i.e., programs stored therein. Moreover, the subscriber may call the authorization center to purchase additional services, such as, subscribing to additional broadcast channels, pay-per-view programs, viewing videos on a pay-per-play basis where the viewer pays for each viewing of the video, etc.

In one embodiment of the present invention, the subscriber is provided with a decryption device, such as in the form of a "card" similar to a credit card, a bank card, or the like, which includes decryption data as well as an authorization representation recorded thereon. Such decryption data and authorization representation may be recorded in a magnetic stripe and, thus, may be changed or updated from time to time. Other forms of recording also are contemplated, such as optical recording of this information, storage in a solid state memory, etc. For convenience, the subscriber's decryption device described above is referred to herein as a "smart card". The authorization representation that may be recorded on the smart card preferably represents a threshold monetary amount which is sufficient to pay the requisite fee for recording and/or reproducing the program (or to purchase other additional services from the cable distribution system). The subscriber simply places the smart card in a smart card receiving unit 15 of the television receiving apparatus from which the requisite fee is deducted, thus obviating the need to place a call to the authorization center.

If the received signal of the selected channel has been encoded (scrambled), the demodulated signal is descrambled, provided that the program represented by that signal is authorized for recording by the television receiving apparatus 6. The descrambled signal is supplied to digital VCR 7 to be stored on a magnetic tape. Also, the authorization data indicating whether the television receiving apparatus is authorized to reproduce is supplied to the digital VCR 7 to be stored in an authorization information area of the magnetic tape. The authorization data is desirably recorded multiple times on different tracks of the magnetic tape to insure reliability. Preferably, the authorization data is recorded twice on two different tracks of the magnetic tape to insure that the authorization data is always present and accessible from the magnetic tape even if one of the tracks is damaged. The authorization area preferably is located at the beginning portion of the magnetic tape.

The digital VCR 7 comprises a transport layer processing circuit 20, a trick play processing circuit 21, an error correction code encoder/decoder 22, a channel encoder/decoder 23, and a tape head mechanism (or recording portion) 24. The transport layer processing circuit 20 decodes data packets, each of which is composed of, for example, 188 bytes and obtains program information from the ID portion of each packet. Data outputted by the transport layer processing circuit 18 is written to a buffer memory (not shown).

The trick play processing circuit 21 reads the data from the buffer memory and is operable to record compressed image data (consistent with the MPEG system) to effect special effects such as high speed reproduction or slow reproduction. For example, when high speed reproduction is performed, the trick play processing circuit 21 records intraframe data on a track of the record medium scanned by the rotating head. In the MPEG system, intraframe data is present in every predetermined number of frames.

An output signal from the trick play processing circuit 21 is supplied to error correction code encoder/decoder 22, the encoding section of which performs error correction code encoding, such as adding parity data. The output from the error correction code encoder/decoder is supplied to a channel encoder/decoder 23, the encoding section of which modulates the output signal of the error correction code encoder/decoder for recording. The output from the channel encoder/decoder 23, which is record data, is supplied to the tape head mechanism portion 24 for recording on the magnetic tape by a rotating head. The tape head mechanism portion 24 comprises a tape guide drum, a tape transport, and a servo circuit. The magnetic tape is wound around the periphery of the tape guide drum and is transported along a predetermined path. It will be seen that a data storage device, such as a hard disk, a video disk or a magnetic disk, may be used with or in place of the digital VCR.

When a digital video tape is placed in the digital VCR 7, the conditional access circuit 13 determines if the television receiving apparatus is authorized to reproduce the program on that video tape. The conditional access circuit 13 reads from a memory (not shown) the authorization data associated with the program to determine if the television receiving apparatus is authorized to reproduce that program. If there is no authorization data in the memory associated with that program, then the conditional access circuit reads from an authorization information area of the video tape in the digital VCR 7 and performs error correction consistent with error correction code, for example, C1 code and/or C2 code. The authorization area preferably is located at the beginning portion of the video tape.

The conditional access circuit 13 causes an indication, such as the energization of a LED (not shown), to be displayed to the subscriber, indicating that the television receiving apparatus is not authorized to reproduce the selected program if the authorization data is not present in either the memory or the video tape in the digital VCR 7.

Such indication informs the subscriber to access the authorization center 32 (FIG. 3) of the cable distribution system to obtain the necessary authorization to reproduce the selected program. If the smart card is not utilized, the subscriber must call the authorization center 32 to obtain the requisite authorization to reproduce the selected program. If a smart card initialized with a predetermined monetary threshold is utilized, the subscriber simply places the smart card in smart card receiving unit 15 of the television receiving apparatus from which the requisite fee for reproducing the program is deducted, thus obviating the need to place a call to the authorization center 32.

If the conditional circuit 13 determines that the television receiving apparatus is authorized to reproduce the program recorded on the video tape in the digital VCR 7, the tape head mechanism 24 reproduces from the magnetic tape the video data constituting the authorized program, which is decoded and demodulated by the decoding section of channel encoder/decoder 23. The decoded data is supplied to the error correction code encoder/decoder 22, the decoding section of which performs error correction consistent with the error correction code, for example, C1 code and/or C2 code.

The decoded data is supplied to the transport layer processing circuit 20 through the trick play processing circuit 21 to convert the format of the decoded data into the format of the received broadcasting signal so that the MPEG decoder 14 can read and decode the decoded data. The MPEG decoder restores the original video data and supplies it to a display unit 8.

Figure 3:
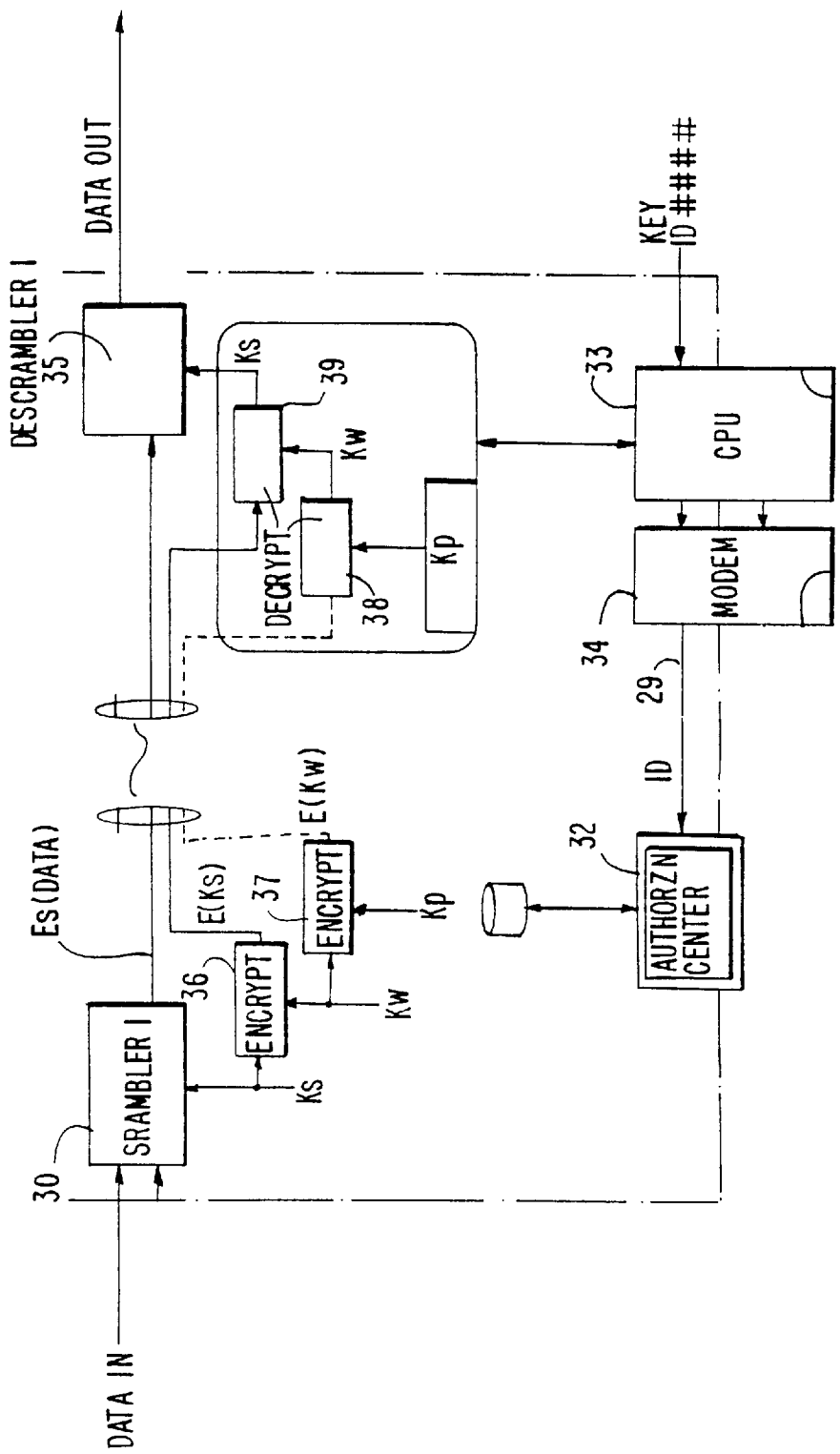
FIG. 3 is a block diagram representing the manner in which a television program is encoded by the head-end controller and decoded by television receivers, for example, in a cable distribution or direct satellite broadcast system.

The manner in which a program received by the conditional access circuit 13 is identified as being authorized for recording is explained in conjunction with FIG. 3. If a subscriber decides to subscribe to a particular channel, the subscriber places a call to the authorization center 32 of the cable distribution system requesting authorization of the subscriber's television receiving apparatus to record the programs on that channel. Authorization data from the authorization center 32 is either transmitted on a predetermined broadcast channel separate and apart from the broadcast channels over which television programs are transmitted or is multiplexed with the television programs.

Alternatively, with an initialized smart card, the subscriber merely inserts the smart card into the smart card receiving unit 15 (shown in FIG. 2) and a microprocessor or CPU 33 of the conditional access circuit 13 deducts the appropriate subscription payment from the balance recorded on the smart card and thereafter sends requests to the authorization center 32 via a modem 34 and a telephone line 29 to transmit the appropriate authorization data to the subscriber's television receiving apparatus. This obviates the need to place a call to the authorization center 32 every time the subscriber wants to subscribe to additional channels.

The smart card is initialized with a predetermined monetary amount, such as $100, in response to the operation of a smart card initialization button (not shown) on the console of the television receiving apparatus, whereupon the microprocessor sends a smart card initialization request signal to the authorization center 32 via modem 34 and telephone line 29. The appropriate authorization code is then transmitted from the authorization center 32 to the microprocessor which records the predetermined monetary amount on the smart card.

In one embodiment, prior to transmitting the program data to the television receiving apparatus, the program data (video data) is encoded (scrambled) at the broadcasting station by a scrambler 30 with a scrambling key Ks. Preferably, each broadcast channel has a respectively different scrambling key Ks to scramble its programs. Since the television receiving apparatus 6 cannot descramble the scrambled programming data without the proper scrambling key Ks, it is necessary to transmit the scrambling key corresponding to a particular broadcast channel to all television receiving apparatus authorized to receive programs on that particular channel. The television receiving apparatus stores the received scrambling keys in its memory (not shown).

When scrambled signals constituting a program are supplied to the television receiving apparatus from the broadcasting station, the conditional access circuit 13 determines if those signals constitute a program that is authorized for recording by the television receiving apparatus. If the conditional access circuit 13 determines that the television receiving apparatus is authorized to record that program, a descrambler 35 of the conditional access circuit 13 descrambles the received program with the stored scrambling key Ks using conventional descrambling techniques. The descrambled program data is then supplied to the digital VCR 7 to be recorded on a video tape.

However, there is a risk in sending the scrambling keys in their original form because they can be easily intercepted by unauthorized subscribers, who then can receive (record) programs without receiving prior authorization from the authorization center 32. That is, "pirates" can view programs without paying the necessary subscription fee. Thus, in accordance with another embodiment of the present invention, the scrambling keys are encrypted (encoded or scrambled) before they are transmitted to the authorized subscribers.

Prior to transmitting the program data to the television receiving apparatus, the program data is scrambled at the broadcasting station by the scrambler 30 with the respective scrambling key Ks which is unique to the channel transmitting that program data. The scrambling key is itself encrypted at the broadcasting station by an encryption unit 36 with a working key Kw. Preferably, each scrambling key is encrypted with a respectively different working key Kw. The television receiving apparatus 6 cannot descramble the scrambled program data with the encrypted scrambling key Ks. Hence, it is necessary to transmit the working key Kw and the scrambling key Ks to enable the television receiving apparatus to descramble the scrambled program data. The television receiving apparatus stores the received scrambling and working keys in its memory (not shown).

When scrambled signals constituting a program are supplied to the television receiving apparatus, the conditional access circuit 13 determines if those signals constitute a program that is authorized for recording by the television receiving apparatus. If the conditional access circuit 13 determines that the television receiving apparatus is authorized to record that program, a decryption unit 39 of the conditional access circuit 13 decodes (decrypts) the received scrambling key with the proper stored working key and supplies the decrypted scrambling key Ks to the descrambler 35 of the conditional access circuit 13. Decoding (or decryption) of the scrambling key Ks is effected by conventional decryption techniques utilizing the stored working key Kw. The descrambler 35 then descrambles the received program with the decrypted scrambling key Ks using conventional descrambling techniques and supplies the descrambled program data to the digital VCR 7 to be recorded on a video tape.

As with the scrambling keys, it is equally risky to send the working keys in their original or unencrypted form. Thus, in accordance with a further embodiment of the present invention, it is preferable to encode the working key Kw before it too is transmitted to the authorized subscribers.

Prior to transmitting the program data to the television receiving apparatus, the program data is scrambled at the broadcasting station by the scrambler 30 with the respective scrambling key Ks which is unique to the channel transmitting that program data The scrambling key Ks is itself encrypted at the broadcasting station by the encryption unit 36 with the working key Kw. Preferably, each scrambling key Ks is encrypted with a respectively different working key Kw. Moreover, the working key Kw is itself encoded (encrypted) at the broadcasting station by an encryption unit 37 with a personal key Kp, which is unique to each television receiving apparatus. The television receiving apparatus 6 cannot descramble the scrambled program data with the encrypted scrambling key Ks. It will be appreciated, therefore, that the working and scrambling keys are also transmitted to the subscriber for each authorized channel and are stored in memory (not shown).

When scrambled signals constituting a program are supplied to the television receiving apparatus, the conditional access circuit determines if those signals constitute a program that is authorized for recording by the television receiving apparatus. If the conditional access circuit determines that the television receiving apparatus is authorized to record that program, a decryption unit 38 of the conditional access circuit 13 decodes the received working key Kw with the pre-stored personal key Kp using conventional decoding (decryption) techniques and supplies the decoded working key Kw to the decryption unit 39 of the conditional access circuit 13. The received scrambling key Ks is then decoded by the decryption unit 39 of the conditional access circuit 13 with the decoded working key Kw likewise in accordance with conventional techniques (which may be the same as or different from Kw decryption) and the decoded scrambling key Ks is supplied to the descrambler 35 of the conditional access circuit 13. The descrambler 35 then descrambles the received program data using the decoded scrambling key Ks and supplies the descrambled programming data to the digital VCR 7 to be recorded on a video tape.

The keys Ks and Kw may be multiplexed onto one or more, or all of the channels that are receivable by the television receiving apparatus or may be transmitted over a separate, distinct channel. The three layers of encoding/encryption/scrambling insure a high level of security and prevent unauthorized recording of the transmitted programs.

Since in the embodiments described hereinabove, the program data is unscrambled prior to being recorded on the magnetic tape there is little to prevent an unauthorized viewer from "tapping" the output of descrambler 35 and thereby watching the program as it is being down-loaded from the head-end 3 (shown in FIG. 1). For example, an authorized subscriber of the channel may not be authorized to receive (reproduce) a special program (pay-per-view) on that channel. As another example, an authorized subscriber may want to view (reproduce) movies recorded on magnetic or video tapes on a pay-per-play basis. However, as will be described, television receiving apparatus in accordance with the present invention may be authorized for the recording of a program, but not necessarily for the reproduction of that program.

Figure 4:
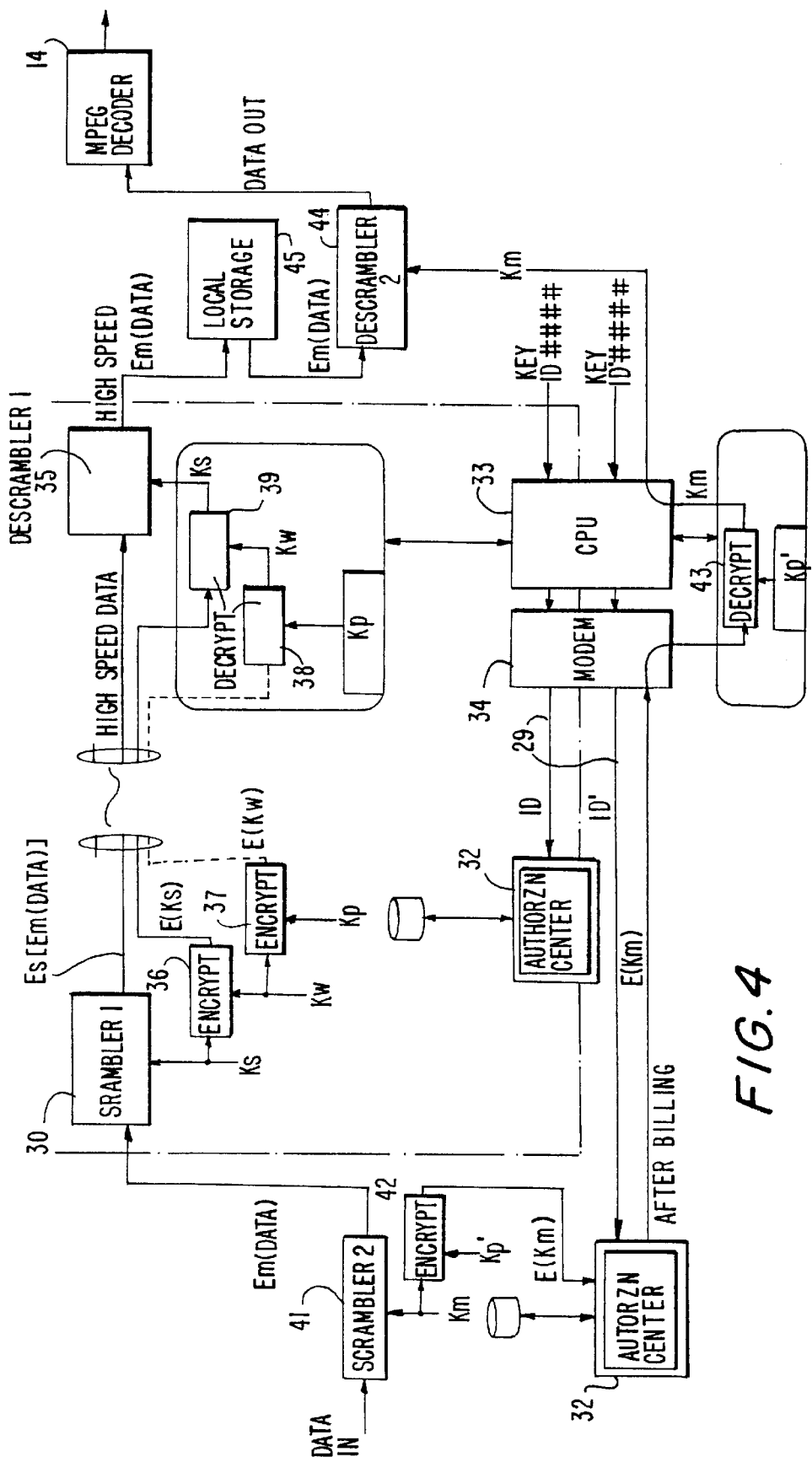
FIG. 4 is a block diagram representing another manner in which a television program is encoded by the head-end controller and decoded by the television receivers, for example, in a cable distribution or direct satellite broadcast system.

The manner in which the television receiving apparatus is prevented from reproducing a program even if it is authorized to record it is represented by the block diagram shown in FIG. 4. For simplicity, elements shown in FIG. 4 corresponding to those shown in FIG. 3 are denoted by the same reference numerals and their description is omitted.

Depending on the method employed, the head-end 3 (shown in FIG. 1) either transmits the appropriate authorization data on a predetermined broadcast channel separate and apart from the broadcast channels over which program data is transmitted or multiplexes the authorization data with the program data transmitted to the subscriber on the respective broadcast channels. Prior to encoding the program data as described hereinabove with respect to FIG. 3, the program data is encoded (scrambled) to prevent an authorized viewer from "tapping" the output of descrambler 35 and thereby watching the program as it is being down-loaded from its head-end 3. Thus, in accordance with yet another embodiment of the present invention, prior to encoding the program data as described hereinabove with respect to FIG. 3, the program data is encoded (scrambled) by a scrambler 41 (FIG. 4) with a modification key Km. Preferably, each program is scrambled with a respectively different modification key Km. Since the television receiving apparatus cannot descramble the scrambled program data without the proper modification key Km, it is necessary to transmit the modification key Km associated with a particular program to all television receiving apparatus authorized to reproduce that particular program. The respective modification key Km is transmitted via the telephone line 29, or on a predetermined broadcast channel separate and apart from the broadcast channel over which television program is transmitted, or is multiplexed with the television program. The television receiving apparatus stores the received modification keys in its memory (not shown) and/or in the authorization information area of the video or magnetic tape or in the storage device where the corresponding program is recorded. Prior to recording the received modification keys in the authorization information area, the television receiving apparatus performs error correction code encoding, such as adding parity data.

When a program is selected from a local store 45, e.g., a video tape in the digital VCR 7, hard disk, video disk or magnetic disk, the conditional access circuit determines if the television receiving apparatus is authorized to reproduce the selected program. The conditional access circuit reads from the memory (not shown) the authorization data associated with the selected program to determine if the television receiving apparatus is authorized to reproduce the selected program. If there is no authorization data in the memory associated with that program, then the conditional access circuit reads from the authorization information area of the local store 45 and performs error correction consistent with error correction code, for example, C1 code and/or C2 code.

If the authorization data associated with the selected program is present in either the memory or the authorization information area of the local store 45, a descrambler 44 of the conditional access circuit 13 descrambles the selected program with the stored modification key Km using conventional descrambling techniques. The descrambled program data is then supplied to the MPEG decoder 14, which restores the original video data and supplies the video data to the display unit 8 whereat it is displayed to the viewer.

As previously discussed, there is a risk in transmitting keys or program data in their original or unencrypted form. Hence, in accordance with still another embodiment of the present invention, the modification key is encrypted with the personal key Kp before it is transmitted to the authorized subscriber.

Prior to transmitting the program data as described hereinabove with respect to FIG. 3, the program data is scrambled at the broadcasting station by the scrambler 41 with the respective modification key Km which is unique to each program data. The modification key Km is itself encrypted at the broadcasting station by the encryption unit 42 with the personal key Kp which is unique to each television receiving apparatus. The television receiving apparatus 6 cannot descramble the scrambled program data with the encrypted modification key Km. It would be appreciated, therefore, that the modification key is transmitted to the subscriber for each authorized program and is stored in the memory (not shown) and/or the authorization information area of the local store 45.

When a program is selected from the local store 45, the conditional access circuit determines if the television receiving apparatus is authorized to reproduce the selected program. The conditional access circuit reads from a memory (not shown) the authorization data associated with the selected program to determine if the television apparatus is authorized to reproduce the selected program. If there is no authorization data in the memory associated with that program, then the conditional access circuit reads from the authorization information area of the local store 45 and performs error correction consistent with error correction code, for example C1 code and/or C2 code.

If the authorization data associated with the selected program is present in either the memory or the authorization information area of the local store 45, a decryption unit 43 of the conditional access circuit 13 decodes (decrypts) the received modification key Km with the pre-stored personal key Kp and supplies the decrypted modification key Km to the descrambler 44 of the conditional access circuit 13. Decoding (decryption) of the modification key Km is effected by conventional decryption techniques utilizing the pre-stored personal key Kp. The descrambler 44 then descrambles the selected program with the decrypted modification key Km using conventional descrambling techniques and supplies the descrambled program data to the MPEG decoder 14, which restores the original video data and supplies the restored video data to the display unit 8 whereat it is displayed to the viewer.

The conditional access circuit 13 disables the operation of the digital VCR 7 and/or causes an indication, such as the energization of an LED (not shown), to be displayed to the subscriber, indicating that the television receiving apparatus is not authorized to reproduce the selected program if the authorization data associated with the selected program is not present in either the memory or the authorization information area of the local store 45. An additional level of security is provided by disabling the digital VCR 7 to prevent unauthorized access to the digital VCR 7, i.e., programs stored therein. The LED indication informs the subscriber to access the authorization center 32 of the cable distribution system to obtain the necessary authorization to reproduce the selected program. If a smart card is not utilized, the subscriber must call the authorization center 32 to obtain the requisite authorization to reproduce the selected program. If a smart card initialized with a predetermined monetary amount is utilized, then the subscriber simply places the smart card in the smart card receiving unit 15 of the television receiving apparatus, from which is deducted the requisite fee for reproducing the program, thus, obviating the need to place a call to the authorization center 32.

The present invention contemplates the existence of a service by which subscribers may rent or purchase a video directly from their cable service provider over the existing cable distribution system. During off-hours (e.g., midnight or some other times specified by the subscriber), the cable service provider periodically transmits all currently available movies (or only those movies satisfying the previously established subscriber's preference such as foreign movies, movies with G, PG, PG-13, R ratings etc.) with the corresponding authorization data to the subscribers' television receiving apparatus using one or a plurality of broadcasting stations in the cable distribution system. The television receiving apparatus records these movies (programs) received during a selected time interval on digital video tapes to be viewed later by the subscriber. After recording these received movies, the television receiving apparatus rewinds the tape to the authorization information area to record the corresponding authorization data. The selected time interval may be a day, a number of days, a week, a month, or a longer time interval. Typically, the time interval is a week and the television receiving apparatus thus stores movies released during the past week.

The subscriber selects a desired movie (program) to view by selecting the magnetic tape containing that movie (or by inserting the proper video tape into the digital VCR 7). If the authorization data associated with the selected program is present in either the memory or the authorization information area of the selected video or magnetic tape, the conditional access circuit determines if the television receiving apparatus has limited or complete authorization to reproduce the selected program. If such authorization status data for the selected program is complete authorization, the television receiving apparatus may reproduce the selected program indefinitely without limitation. In fact, complete authorization status associated with the selected program enables other television receiving apparatus to reproduce the selected program even if the authorization data associated with the selected program is not present in the memory of that other television receiving apparatus. Storing the authorization data on video tapes has the added advantage of allowing the viewers to share their videos with each other.

If the authorization status data of the selected program is limited authorization, then the conditional access circuit determines if the rental period has expired for that video tape containing the selected program. The conditional access circuit reads from the memory (not shown) the expiration date data associated with the selected program to determine if the rental period has expired. If there is no expiration date data in the memory associated with the selected program, then the conditional access circuit reads from the authorization information area of the selected video or magnetic tape in the digital VCR 7. If the rental period has not expired on the video tape containing the selected program, the television receiving apparatus may reproduce the selected program until the rental period expires.

The microprocessor 33 of the conditional access circuit 13 reads clock data (not shown) to obtain the current date data. The microprocessor then determines if the rental period has expired by comparing the current date data and the expiration date data of the selected program. The television receiving apparatus no longer is authorized to reproduce the selected program if the expiration date of the selected program is prior to the current date.

If the rental period has expired, the television receiving apparatus cannot reproduce the selected program unless the rental period is extended or unless the authorization status of the selected program is changed to complete authorization. The subscriber can extend the rental period or change the status associated with the selected program to complete authorization by accessing the authorization center of the cable distribution system to authorize such change. Upon proper payment by the subscriber, the authorization center transmits new authorization data associated with the selected program to the subscriber's television receiving apparatus via the telephone line 29, or on a predetermined broadcast channel separate and apart from the broadcast channel over which television program is transmitted, or is multiplexed with the television program. If a smart card is utilized, the subscriber merely inserts the smart card into the smart card receiving unit 15 (shown in FIG. 2) and microprocessor 33 of the conditional access circuit 13 deducts the appropriate fee from the balance recorded on the smart card and sends the request to the authorization center 32 via modem 34 and telephone line 29 to extend the rental period or change the status of the selected program to complete authorization. This obviates the need to place a call to the authorization center 32 every time the subscriber wants to extend the rental period or change the status of the selected program.

While the present invention has been particularly shown and described with reference to a preferred embodiment, it will be readily appreciated that various changes may be made without departing from the spirit and scope of the invention. For example, the program information data need not be multiplexed onto one or more, or all of the channels that are receivable by the television receiving apparatus, but rather, may be transmitted over a separate, distinct channel. Also, although the television receiving apparatus illustrated herein has been described as being present in a set-top converter for cable or direct satellite broadcast distribution systems, or may be provided directly in a television receiver or video recorder, it is understood that such apparatus may be disposed in a separate stand-alone unit.

It is intended that the appended claims be interpreted as including the embodiments discussed above with reference to the drawings, those various alternatives which have been described and all equivalents thereto.

What is claimed:

1. Apparatus for selectively inhibiting a television receiving device from reproducing from a recording medium video programs which the apparatus is not authorized to reproduce, comprising:

means for reading from a memory program information associated with programs that are reproducible by said television receiving device, said program information including authorization data indicating whether said apparatus is authorized to reproduce one or more of said associated programs;

means for selecting a program to be reproduced from said recording medium;

means for operating the means for reading to read from said memory the authorization data associated with said selected program to determine if said apparatus is authorized to reproduce said selected program, said authorization data including authorization status information indicating whether said apparatus has a limited or complete authorization to reproduce said selected program, expiration date data representing the last date said apparatus with said limited authorization status is authorized to reproduce said selected program, and price data representing additional payment required to change the authorization status of said apparatus with said limited authorization status to said complete authorization status;

means for inhibiting said television receiving device from reproducing said selected program if it is determined that said apparatus is not authorized to reproduce said selected program; and means for reproducing from said recording medium said selected program if it is determined that said apparatus is authorized to reproduce said selected program.

2. The apparatus of claim 1, wherein the means for reading is operable to read the authorization status information associated with said selected program to determine if said apparatus has the limited or complete authorization to reproduce said selected program; wherein the reproducing means is operable to reproduce from said recording medium said selected program if it is determined said apparatus has the complete authorization to reproduce said selected program; and wherein the reading means is operable to read the expiration date data associated with said selected program if it is determined said apparatus has the limited authorization to reproduce said selected program.

3. The apparatus of claim 2, further comprising means for generating current date data and means for comparing the current date data to said expiration date data associated with said selected program to determine if said apparatus no longer is authorized to reproduce said selected program; and wherein the means for inhibiting is operable to inhibit said apparatus from reproducing said selected program if it is determined that said apparatus no longer is authorized to reproduce said selected program.

4. The apparatus of claim 3, wherein said means for inhibiting is operable to prevent said television receiving device from accessing said recording medium.

5. The apparatus of claim 1, further comprising means for modifying the status information in response to a change status command transmitted from a source.

6. Apparatus for selectively inhibiting a television receiving device from reproducing from a digital video record medium video programs which the apparatus is not authorized to reproduce, comprising:

means for storing program information associated with programs that are reproducible by said television receiving device in at least one of a memory and a portion of said record medium, said program information including record medium identification data to uniquely identify said record medium and including authorization data indicating whether said apparatus is authorized to reproduce one or more of said associated programs;

means for selecting a program to be reproduced from said record medium;

means for generating a list of authorized programs and said record medium identification data, each program being associated with respective record medium identification data that identifies the record medium on which that program is recorded;

means for comparing the record medium identification data of said record medium to the record medium identification data of said generated list to determine if the authorization data associated with said selected program is present in said memory and wherein said reading means is operable to read from said record medium the authorization data associated with said selected program if it is determined that said authorization data associated with said selected program is not present in said memory;

means for determining from the authorization data associated with said selected program whether or not said apparatus is authorized to reproduce said selected program;

means for inhibiting said television receiving device from reproducing said selected program if it is determined that said apparatus is not authorized to reproduce said selected program; and means for reproducing from said record medium said selected program if it is determined that said apparatus is authorized to reproduce said selected program.

7. Apparatus for selectively inhibiting a television receiving device from recording and/or reproducing video programs which are not authorized for viewing, comprising:

means for receiving a video program;

a memory for storing program information associated with programs that are recordable and reproducible by said television receiving device, said program information including authorization data indicating whether said apparatus is authorized to record and/or reproduce said received program, and said authorization data including authorization status information indicating whether said apparatus has a limited or complete authorization to reproduce said received program, expiration date data representing the last date said apparatus with said limited authorization status is authorized to reproduce said received program, and price data representing additional payment required to change the authorization status of said apparatus with said limited authorization status to said complete authorization status;

means for reading from said memory the authorization data associated with said received program to determine if said apparatus is authorized to record said received program;

means for inhibiting said television receiving device from recording said received program if it is determined that said apparatus is not authorized to record said received program;

means for recording said received program on a recording medium if it is determined that said apparatus is authorized to record said received program;

means for selecting a program to be reproduced from said recording medium;

means for operating the means for reading to read from said memory the authorization data associated with said selected program to determine if said apparatus is authorized to reproduce said selected program;

means for operating the means for inhibiting to inhibit said television receiving device from reproducing said selected program if it is determined that said apparatus is not authorized to reproduce said selected program; and means for reproducing from said recording medium said selected program if it is determined that said apparatus is authorized to reproduce said selected program.

8. The apparatus of claim 7, wherein the means for reading means is operable to read the authorization status information associated with said selected program to determine if said apparatus has the limited or complete authorization to reproduce said selected program; wherein the reproducing means is operable to reproduce from said recording medium said selected program if it is determined said apparatus has the complete authorization to reproduce said selected program; and wherein the reading means is operable to read the expiration date data associated with said selected program if it is determined said apparatus has the limited authorization to reproduce said selected program.

9. The apparatus of claim 8, further comprising means for generating current date data and means for comparing the current date data to said expiration date data associated with said selected program to determine if said apparatus no longer is authorized to reproduce said selected program; and wherein the means for inhibiting is operable to inhibit said apparatus from reproducing said selected program if it is determined that said apparatus no longer is authorized to reproduce said selected program.

10. The apparatus of claim 9, wherein said means for inhibiting is operable to prevent said television receiving device from accessing said recording medium.

11. The apparatus of claim 9, further comprising means for modifying the authorization status information in response to a change status command transmitted from a source.

12. Apparatus for selectively inhibiting a television receiving device from recording and/or reproducing video programs which are not authorized for viewing, comprising:

means for receiving a video program;

a memory for storing program information associated with programs that are recordable and reproducible by said television receiving device, said program information including record medium identification data and authorization data indicating whether said apparatus is authorized to record and/or reproduce said received program;

means for reading from said memory the authorization data associated with said received program to determine if said apparatus is authorized to record said received program;

means for inhibiting said television receiving device from recording said received program if it is determined that said apparatus is not authorized to record said received program;

means for recording said received program on a video record medium if it is determined that said apparatus is authorized to record said received program;

means for selecting a program to be reproduced from said video record medium;

means for generating a list of authorized programs and said record medium identification data, each program being associated with respective record medium identification data that identifies the record medium on which that program is recorded;

means for comparing the record medium identification data of said record medium to the record medium identification data of said generated list to determine if the authorization data associated with said selected program is present in said memory and wherein said reading means is operable to read from said record medium the authorization data associated with said selected program if it is determined that said authorization data associated with said selected program is not present in said memory, and is operable to read from said memory the authorization data associated with said selected program to if it is determined that said authorization data associated with said selected program is present in said memory;

means for operating the means for inhibiting to inhibit said television receiving device from reproducing said selected program if it is determined that said apparatus is not authorized to reproduce said selected program; and means for reproducing from said video record medium said selected program if it is determined that said apparatus is authorized to reproduce said selected program.

13. Method of selectively inhibiting a television receiving apparatus from reproducing from a recording medium video programs which the apparatus is not authorized to reproduce, comprising the steps of:

reading from a memory program information associated with programs that are reproducible by said apparatus, said program information including authorization data indicating whether said apparatus is authorized to reproduce one or more of said associated programs, and said authorization data including authorization status information indicating whether said apparatus has a limited or complete authorization to reproduce one or more of said associated programs, expiration date data representing the last date said apparatus with said limited authorization status is authorized to reproduce said one or more associated programs, and price data representing additional payment required to change the authorization status of said apparatus with said limited authorization status to said complete authorization status;

selecting a program to be reproduced from said recording medium;

reading from said memory the authorization data associated with said selected program to determine if said apparatus is authorized to reproduce said selected program;

inhibiting said apparatus from reproducing said selected program if it is determined that said apparatus is not authorized to reproduce said selected program; and reproducing from said recording medium said selected program if it is determined that said apparatus is authorized to reproduce said selected program.

14. The method of claim 13, further comprising the steps of:

reading the status associated with said selected program to determine if said apparatus has the limited or the complete authorization to reproduce said selected program;

reproducing from said recording medium said selected program if it is determined said apparatus has the complete authorization to reproduce said selected program; and reading the expiration date data associated with said selected program if it is determined said apparatus has the limited authorization to reproduce said selected program.

15. The method of claim 14, further comprising the steps of:

generating current date data;

comparing the current date data to said expiration date data associated with said selected program to determine if said apparatus no longer is authorized to reproduce said selected program; and inhibiting said apparatus from reproducing said selected program if it is determined that said apparatus no longer is authorized to reproduce said selected program.

16. The method of claim 15, wherein the step of inhibiting includes preventing said apparatus from accessing said recording medium.

17. The method of claim 13, further comprising the step of modifying the status information in response to a change status command transmitted from a source.

18. Method of selectively inhibiting a television receiving apparatus from reproducing from a video record medium video programs which the apparatus is not authorized to reproduce, comprising the steps of:

reading from a memory program information associated with programs that are reproducible by said apparatus, said program information including includes record medium identification data to uniquely identify said record medium and authorization data indicating whether said apparatus is authorized to reproduce one or more of said associated programs;

recording on said record medium said program information associated with programs recorded on said record medium;

selecting a program to be reproduced from said video record medium;

generating a list of authorized programs and said record medium identification data, each program being associated with respective record medium identification data that identifies the record medium on which that program is recorded;

comparing the record medium identification data of said record medium to the record medium identification data of said generated list to determine if the authorization data associated with said selected program is present in said memory;

reading from said memory the authorization data associated with said selected program to determine if it is determined that said authorization data associated with said selected program is present in said memory; and reading from said record medium the authorization data associated with said selected program if it is determined that said authorization data associated with said selected program is not present in said memory;

inhibiting said apparatus from reproducing said selected program if it is determined that said apparatus is not authorized to reproduce said selected program; and reproducing from said video record medium said selected program if it is determined that said apparatus is authorized to reproduce said selected program.

* * * * *